US008878909B1

(12) United States Patent
Prince

(10) Patent No.: US 8,878,909 B1
(45) Date of Patent: Nov. 4, 2014

(54) SYNTHESIS OF NARROW FIELDS OF VIEW TO CREATE ARTIFACT-FREE 3D IMAGES

(76) Inventor: John H. Prince, Los Altos, CA (US)

( * ) Notice: Subject to any disclaimer, the term of this patent is extended or adjusted under 35 U.S.C. 154(b) by 839 days.

(21) Appl. No.: 12/927,836

(22) Filed: Nov. 26, 2010

(51) Int. Cl.
*G06K 9/00* (2006.01)

(52) U.S. Cl.
USPC ............................................................ 348/47

(58) Field of Classification Search
CPC  G06K 9/0073; G06K 9/0014; G06K 9/00268
USPC .......................................................... 348/47
See application file for complete search history.

(56) References Cited

U.S. PATENT DOCUMENTS

| 5,262,871 | A | * | 11/1993 | Wilder et al. | 348/307 |
| 5,282,255 | A | | 1/1994 | Bovik et al. | 382/239 |
| 5,291,889 | A | * | 3/1994 | Kenet et al. | 600/425 |
| 5,766,006 | A | * | 6/1998 | Murljacic | 433/26 |
| 6,486,898 | B1 | | 11/2002 | Martino et al. | 715/853 |
| 6,535,644 | B1 | | 3/2003 | Kurapati | 382/240 |
| 7,679,622 | B2 | | 3/2010 | Lee et al. | 345/619 |
| 7,783,129 | B2 | | 8/2010 | Aoyama et al. | 382/275 |
| 7,965,314 | B1 | * | 6/2011 | Miller et al. | 348/164 |
| 2002/0180877 | A1 | * | 12/2002 | Kikuchi | 348/315 |
| 2005/0117015 | A1 | * | 6/2005 | Cutler | 348/38 |
| 2011/0164108 | A1 | * | 7/2011 | Bates et al. | 348/36 |
| 2011/0199578 | A1 | * | 8/2011 | Black et al. | 351/206 |

OTHER PUBLICATIONS

P.E. Freeman, "XRay Source Detection Using the Wavelet Transform", Astronomical Data Analysis Software Systems V ASP Conference Series vol. 101, 1996.*

* cited by examiner

*Primary Examiner* — Sath V Perungavoor
*Assistant Examiner* — Jeffery Williams
(74) *Attorney, Agent, or Firm* — File-EE-Patents.com; Jay A. Chesavage

(57) ABSTRACT

The present invention is an analog of a set of human eyes, capturing 3D images on a conjugate pair of foveae, with the additions that (i) there can be multiple, independent, conjugate pairs of foveae, and (ii) under computer control, certain conjugate pairs of foveae can be made to move across the detecting surfaces simultaneously to follow moving objects while the lenses remain fixed. Since foveal fields of view are very narrow—of the order of one degree—and little information is transmitted to the computer (or brain) outside this range—there is almost no cross-talk between foveae. By using multiple foveae within each detector, images may be stitched together by algorithms to produce virtually ghost-free full-field 3D images for display.

23 Claims, 13 Drawing Sheets

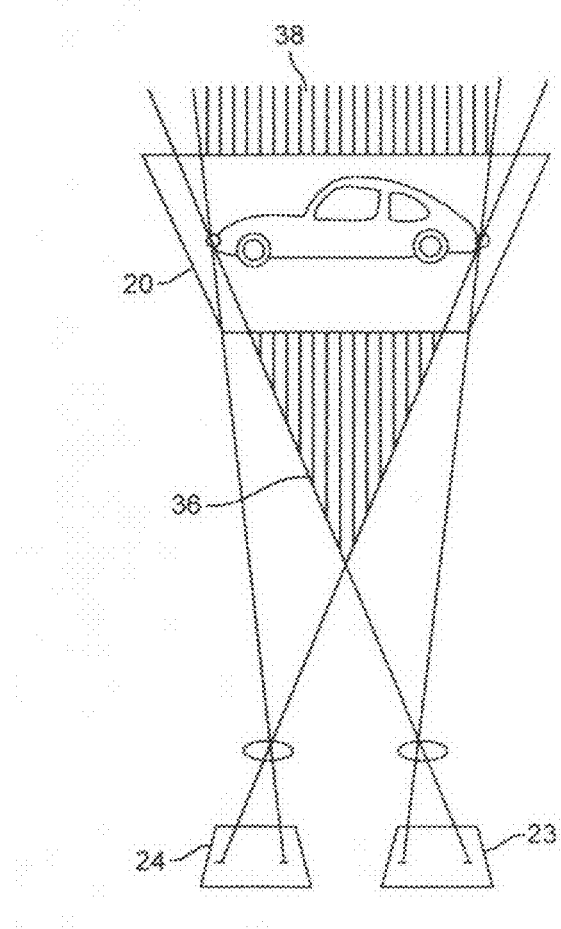 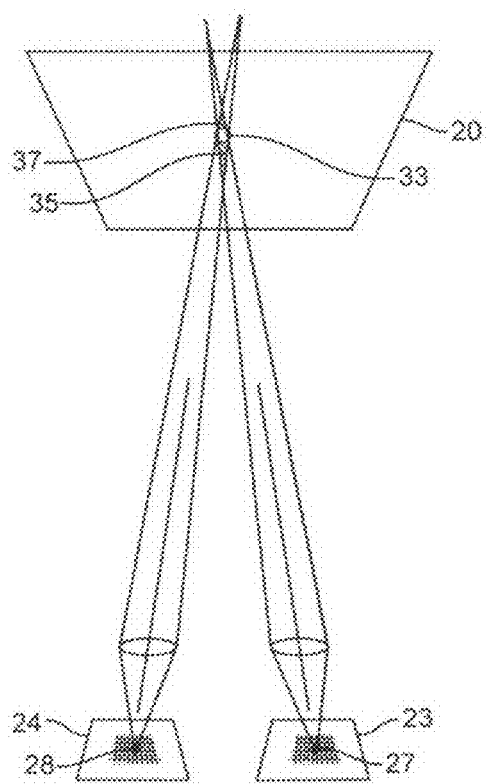
FIG. 8
PRIOR ART
FIG. 9

SYNTHESIS OF NARROW FIELDS OF VIEW TO CREATE ARTIFACT-FREE 3D IMAGES

BACKGROUND OF THE INVENTION

1. Field of the Invention

This invention relates to the recording of ghost- and artifact-free three-dimensional images throughout the electromagnetic spectrum. (Inter alia for photography, film-making, video, television, infra-red imaging, microwave, biometrics, medicine, and astronomy). More specifically, this invention relates to ghost-free three-dimensional recording in the visible spectrum, for example with film or hand-held cameras. Steps in this present invention relate to preparing these images for transmission and display.

2. Description of the Related Art

A pair of human eyes has evolved through aeons of trial and error as an efficient method of focusing stereo images without ghosts or artifacts for transmittal to (and storage in) the brain. An eyeball is shown in FIG. 1

The absence of ghosts and artifacts is achieved as follows. Images are intensely and acutely focused on the fovea centralis, a one millimeter area with very closely packed cones. As the nerve center of the eye, with a thousandth of its retinal area, the fovea uses fully half of the eye's optic nerves to send highly concentrated information to the brain. This means that the information gathering capacity of the remaining cones diminishes rapidly through the parafoveal and perifoveal areas until at the outer limbs the eyes perceive light and colours but with little form.

This last critical fact appears to have been (thus far) little noted in the design of 3D cameras. From the origins of photography (and especially filming) it has been assumed that an image must be equally clear in every dimension. However, it has been observed in this invention that the ability of the eyes to ignore virtually all peripheral information as irrelevant (except in emergency) has led to the brilliant success of specie and primate vision. It is that the information noticed, but ignored, by the eyes at the peripheries, does not (and should not) detract from the utter clarity of the central focus. It has also been observed that any pair (or multiplicity) of conjoined imaging devices will produce ghosts (a) unless they are tightly focused and (b) unless images at the periphery are essentially ignored by the system.

It is further noted that two basic possibilities emerge for the viewing of a three-dimensional image: either viewing a "foveated" image, which is extremely clear in a chosen spot when seen with either stereo glasses or presented on a prismatic or parallax screen; or viewing a "super"-image which, similarly presented, is extremely clear all over in three dimensions, since the ghosting has been eliminated by a process (shown in an algorithm below) of reconstruction.

It is here observed that the human brain, partly under its own volition, continuously reconstructs three-dimensional scenes from myriad and minutely focused observations, often quasi-randomly selected, in real time. Stored in the brain as "memory", this is refreshed and refined with new observations, and "re-membered", (often vividly) even with eyes closed.

In the present invention the "re-membering" (or as is said here, "re-construction" or "synthesis") is done (without human error) in virtually real time. Displays can be viewed (even without glasses) as they are being recorded It is also noted here that there are other popular techniques for recording, involving beam-splitting and multiple optical pathways, mechanical shutters, liquid crystals and polarizers. Virtually all these techniques try to capture the "whole field" either sequentially or at once.

It is noted that for displays, shuttered glasses, polarizing glasses, and anaglyph (coloured) glasses are usually required. As a (good) example, "Luma (or 2D) plus Depth" is able to produce dazzling artificial images for advertising, but preparation requires weeks and months of high-powered computing. It can be viewed on prismatic ("signage") screens and seen in some European supermarkets (without glasses). But, like the other techniques, this fails in real time recording and with real images.

What appears required for providing content to modern 3D displays is a recording system with the qualities of low-cost, light-weight, real-time, long-lived, reliable, of high image quality and self-sufficient—in other words, portable and useable in real time. The output of this recording system should be adaptable to any type of display. An embodiment of just such a system is here shown in FIG. 20.

SUMMARY OF THE INVENTION

The present invention begins as an analog of a set of human eyes, capturing images on a complementary set of two foveae, with the exception that, under computer control, the complementary (or conjugate) foveal pair is a unit and can exist anywhere on the detecting surfaces and can move across them simultaneously to focus on objects while the lenses remain fixed. (Here we define the words "complementary" and "conjugate" as interchangeable)

Because the field of view of each fovea is very narrow—of the order of one or two degrees—and little information is transmitted to the brain or computer outside this range—there is almost no overlap between the images gained by the two foveae. This virtually eliminates ghosting.

We can build on this fact by adding independent but complementary (but not necessarily overlapping) foveal pairs to the detectors until the space is adequately filled for full acquisition of images. A process of stitching can then tie the images on each detector together to fill the image fields.

This process is similar to a summing of small sections by infinitesimal calculus, where the integration of small pieces lends itself to the rendering of an area (such as an entire detector) with virtually perfect images, without artifacts or ghosting.

By allowing the foveae to be of a certain size (here we are copying the eye, say on the order of 10,000 to 25,000 pixels) —and by limiting the stitching to just a few compatible fringe pixels—we can enormously speed up the processing time for capturing consecutive 3D video images.

Other advantages accrue from the foveal approach, such as: compensation for axis misalignment between the two detectors; correction of differences between lenses in magnification, focal length, and zoom; compensation for aberrations in one lens or the other, and compensation for motion or jitter in the camera.

Also, if ever the camera is dropped or warped by heat, an alignment algorithm (as in FIG. 10) can be automatically invoked through software to re-index the conjugate foveae.

The emphasis on all operations is speed, so that three dimensional images can be rendered swiftly for video conferencing or display. Increased speed also allows smoothing of objects in motion, resulting in more pleasurable viewing of three-dimensional images.

We note again that objects can be tracked by conjugate foveae moving across the detectors. Within their field ranges, unlike the human eye, the detecting surfaces do not have to move.

From this invention many important image processing corollaries accrue.

BRIEF DESCRIPTION OF THE DRAWINGS

This invention, together with further advantages set forth herein, may best be understood by reference to the following descriptions taken in conjunction with the accompanying sheets of drawings, in the several figures of which like reference numerals identify like elements, and in which:

FIG. 8 shows the results of simultaneously capturing an entire field (containing an automobile) onto two detectors, as in prior art.

FIG. 9 shows the results of capturing a small object (such as a leaf on a tree) onto conjugate foveae, as in the present invention.

DETAILED DESCRIPTION OF THE INVENTION

Figure 1:
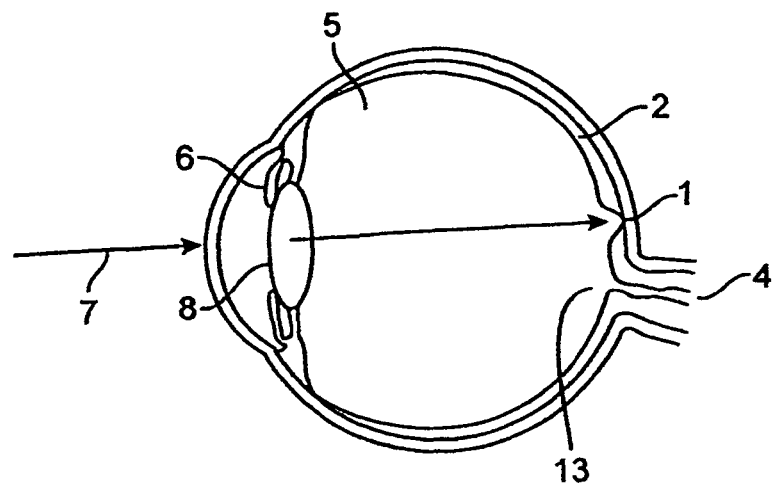
FIG. 1 is a section of the human eye, showing the iris, lens, retina and fovea centralis.

FIG. 1 is a sagittal view of the human eye, showing the principal ray 7 which passes through the iris 6 and is focused by the lens 8 on the fovea centralis 1. (The fovea is offset four to eight degrees above the center-line). The fovea uses fully fifty percent of the capacity of the optic nerve 4 to convey information to the optic chiasma, thence for processing to the brain and storage in the visual cortex. The rest of the retina 2, which covers an area a thousand times that of the fovea, uses the other fifty percent of the capacity of the optic nerve. This means that the perceptivity of the retina is greatly diminished beyond the fovea and that at the outer limbs (the ora serrata) the retina perceives little information except as light and some colour. 5 is the vitreous humor and 13 is the blind spot (shown as a gap in the next figure).

Figure 2:
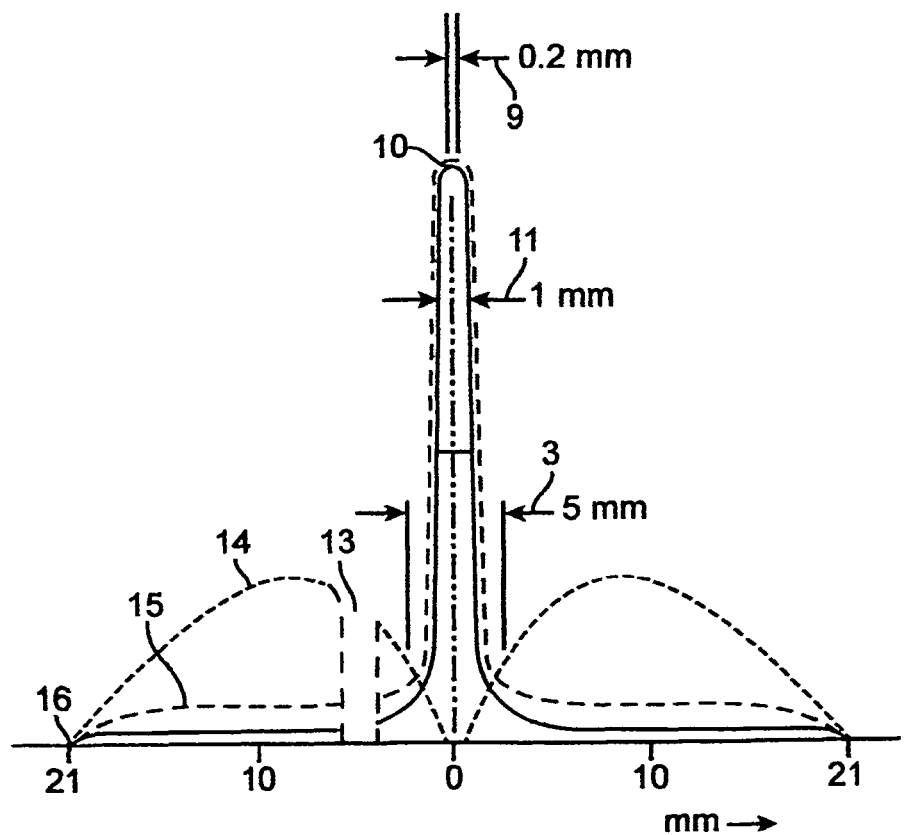
FIG. 2 is a graph of the central retina, showing the concentration of rods, cones and relative abundance of optic nerves carrying information to the brain, from the fovea centralis outwards.

FIG. 2 is a graph showing the concentration of cones (solid line 10), innervation (dashed line 15), rods (dotted line 14) from the foveola 9, fovea 11 and macula 3 to the outer limbs and finally to the retinal limits at 16. The integrated areas under each curve represent the total number of cones, innervation and rods in the eye: there are many fewer cones than rods beyond the macula. This distribution of cones is important to our discussion.

Figure 3:
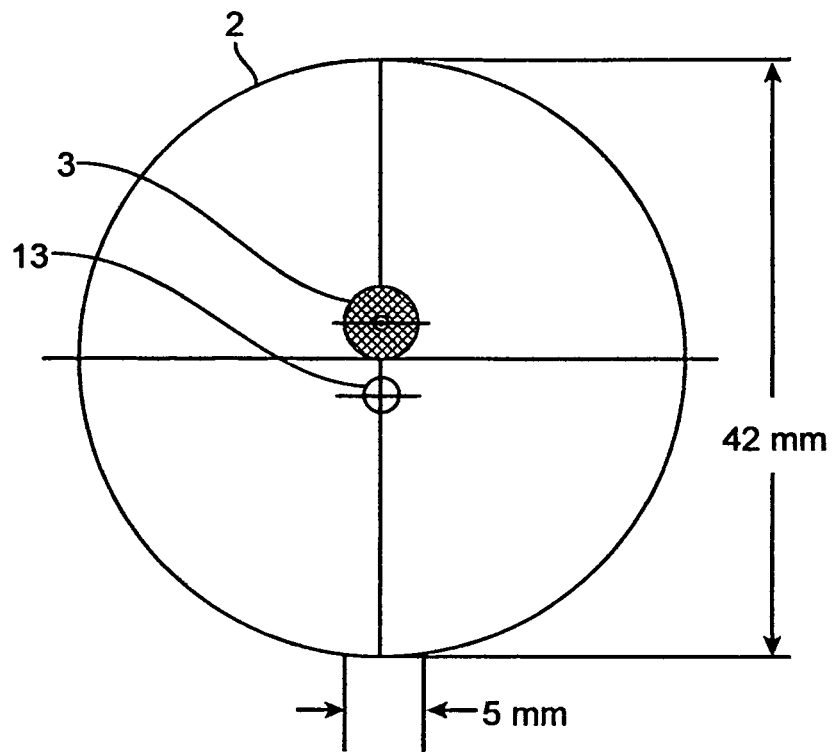
FIG. 3 is a frontal section of the eye, showing the relative sizes of the macula and entire retina.
Figure 4:
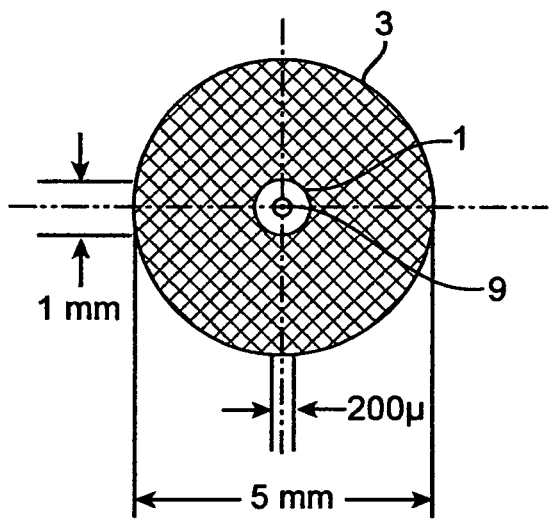
FIG. 4 is a blow-up of the macula, showing the relative sizes of the foveola and fovea within the macula.

FIG. 3 and FIG. 4 show (to relative scale) the diameters of the foveola 9 (200µ), the fovea 1 (1 mm), the macula 3 (5 mm), the blind spot 13 (2 mm) and the entire retina 2 (42 mm). (Photographic images confirm those approximate diameters). Noted also in photographs are that the cones (distorted into hexagons in the fovea, see FIG. 18) are close to 2µ in diameter, implying that the foveola contains 10,000 cones and the fovea 50,000 cones. The central cones, unlike those further out, each trigger one ganglion (or nerve) which then bundle to carry fifty percent of the visual information from the retina to the brain. The rest of the retina, with an area of 1000 times that of the fovea, accounts for the other fifty percent of the information to the brain. The innervation is less than the number of rods and cones by a large factor, since many outer cells bundle up to use one nerve.

In a five mega-pixel CMOS detector the cell sizes are also 2µ. The numbers for the cones in the foveola or fovea therefore give a benchmark for the organization of pixels in CMOS detectors. For example, for accurate, narrow focusing, pixels can be combined in lots of 10,000 to 25,000 as foveae and these can then be reconstructed to create full five mega-pixel images.

Figure 5:
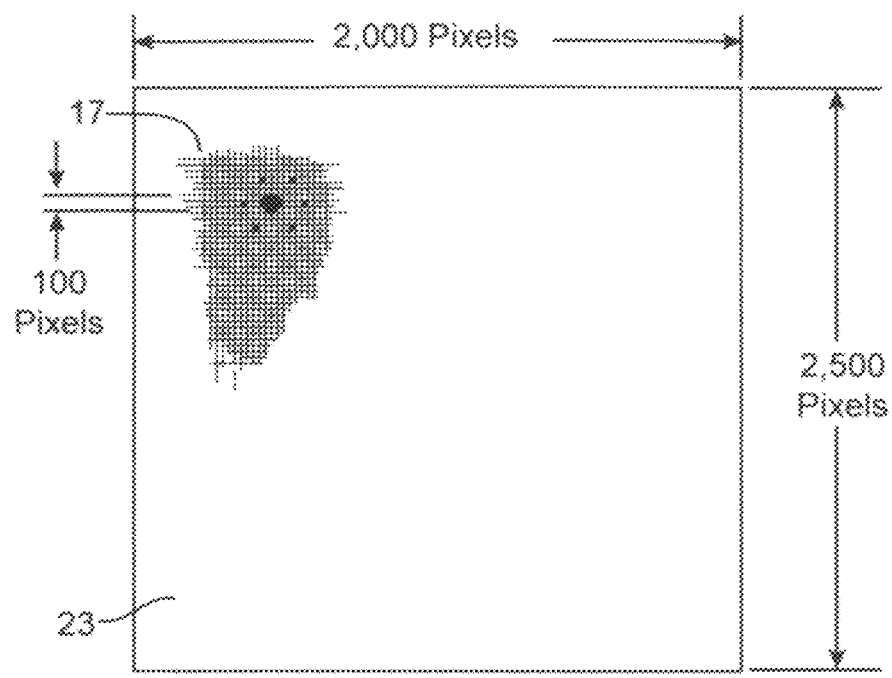
FIG. 5 is a representation of a five mega-pixel CMOS detector showing a dark area similar to that of the foveola within the eye.
Figure 6:
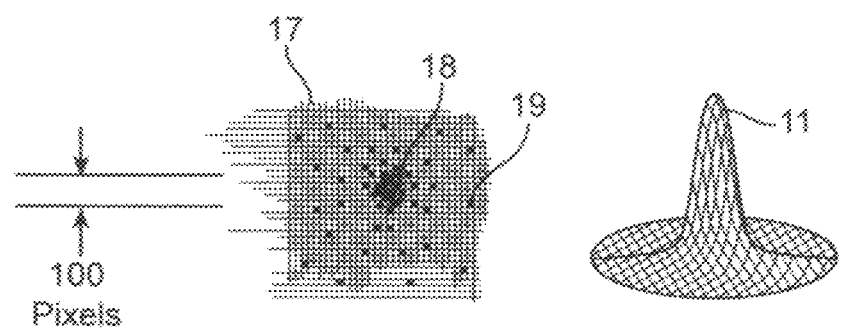
FIG. 6 is a blow-up of the dark area in FIG. 5, showing a representative distribution of active pixels, one subject of this invention.

FIG. 5 and FIG. 6 show the analog of the foveola 18 on a section 17 of a 5 mega-pixel CMOS chip 23, to relative scale. Here it is shown as 100 pixels (200µ) on a side as in the foveola. It could also be 500 pixels (1 mm) on a side, as in the fovea, or other chosen dimensions or shapes. The distribution of detecting pixels (outlying black spots 19) will be similar to that of cones in the human eye, as shown in the solid line 11 of FIG. 2 and shapes 11 of FIG. 6.

Figure 7:
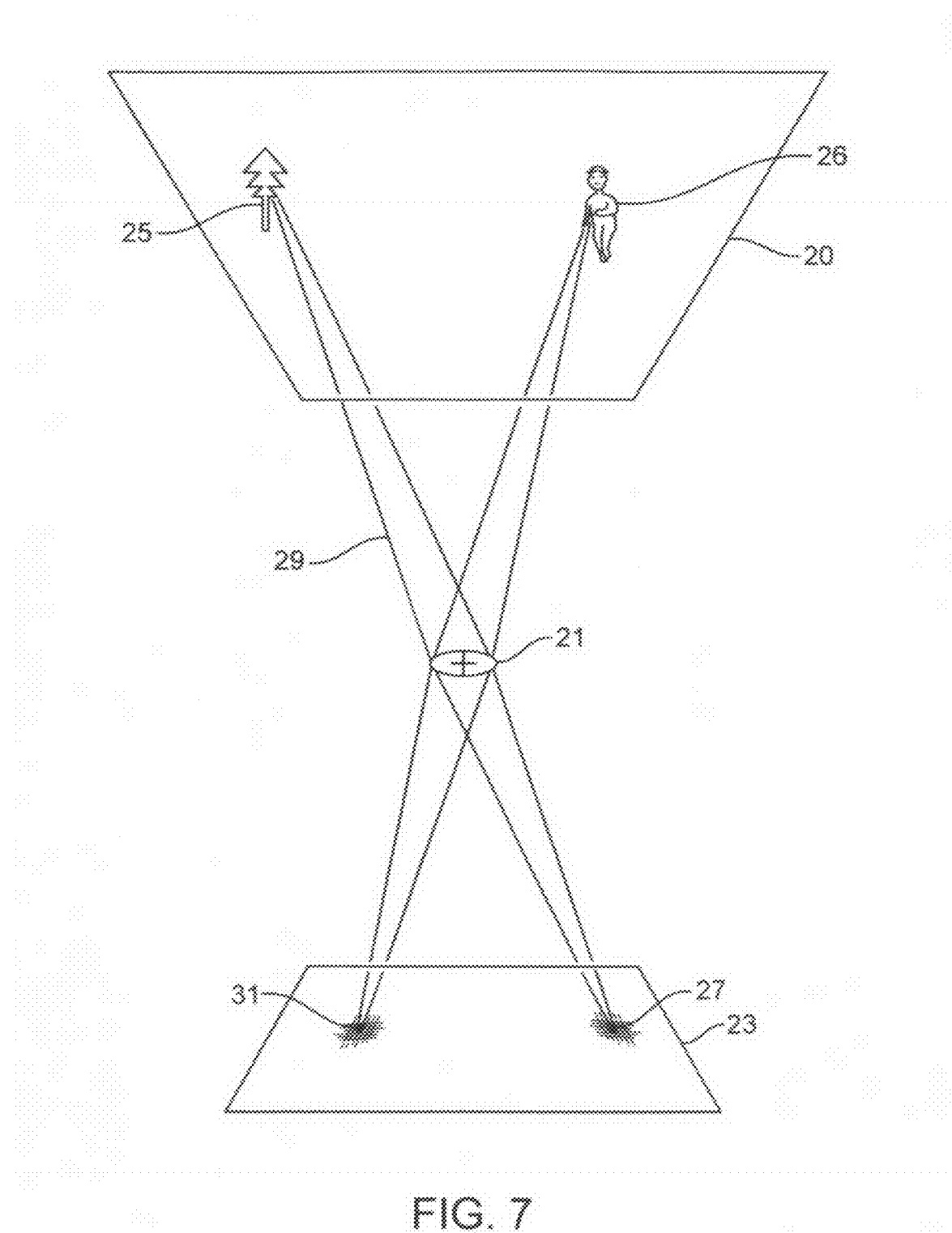
FIG. 7 is a single optical path from a field object through a lens system focused onto a single replication of the fovea. A second object is shown focused on a replication of the fovea in a second position.

FIG. 7 shows a field 20 containing a tree 25 and a man 26, seen narrowly by rays 29 through a lens 21 and imaged respectively onto two foveae 27 and 31 on detector 23. To create a full resolution image of field 20 there will be many such foveae, as will be shown later.

FIG. 8 shows prior art, where the results of simultaneously capturing objects (such as an automobile) in an entire object plane ("full field imaging") 20 onto two detectors 24 and 23 is shown. The shaded areas show the overlap of the visual fields of the two detectors. Objects seen in front of the object plane 20 (shaded area 36) will show up at inappropriate (i.e. non-complementary) locations on detectors 24 and 23, and will therefore be recorded as ghosts. Similarly, objects seen behind the object plane 20 (shaded area 38) will also show up in inappropriate locations on the two detectors as ghosts. Only objects in the plane of the car will be in focus and ghost-free.

FIG. 9 is one subject of this invention. An object 33 (which could be a leaf on a tree) is shown on the object plane 20. The ray paths from foveal points 28 and 27 converge narrowly towards object 33, so that the shaded areas 35 and 37 are almost non-existent. Therefore ghosts from this cause will be nearly imperceptible. Therefore a summation of images from foveal points such as 28 and 27, fully filling detectors 24 and 23, when brought together on a three-dimensional display, will be virtually ghost-free.

We are ignoring (for the moment) the issues of focal length and depth of field and assuming that the field of view 20 is roughly coplanar and the focal length is the distance to the objects in that field. For other focal lengths (especially close-ups) the lens focal lengths would have to be changed and the foveae re-conjugated (more later).

Figure 10:
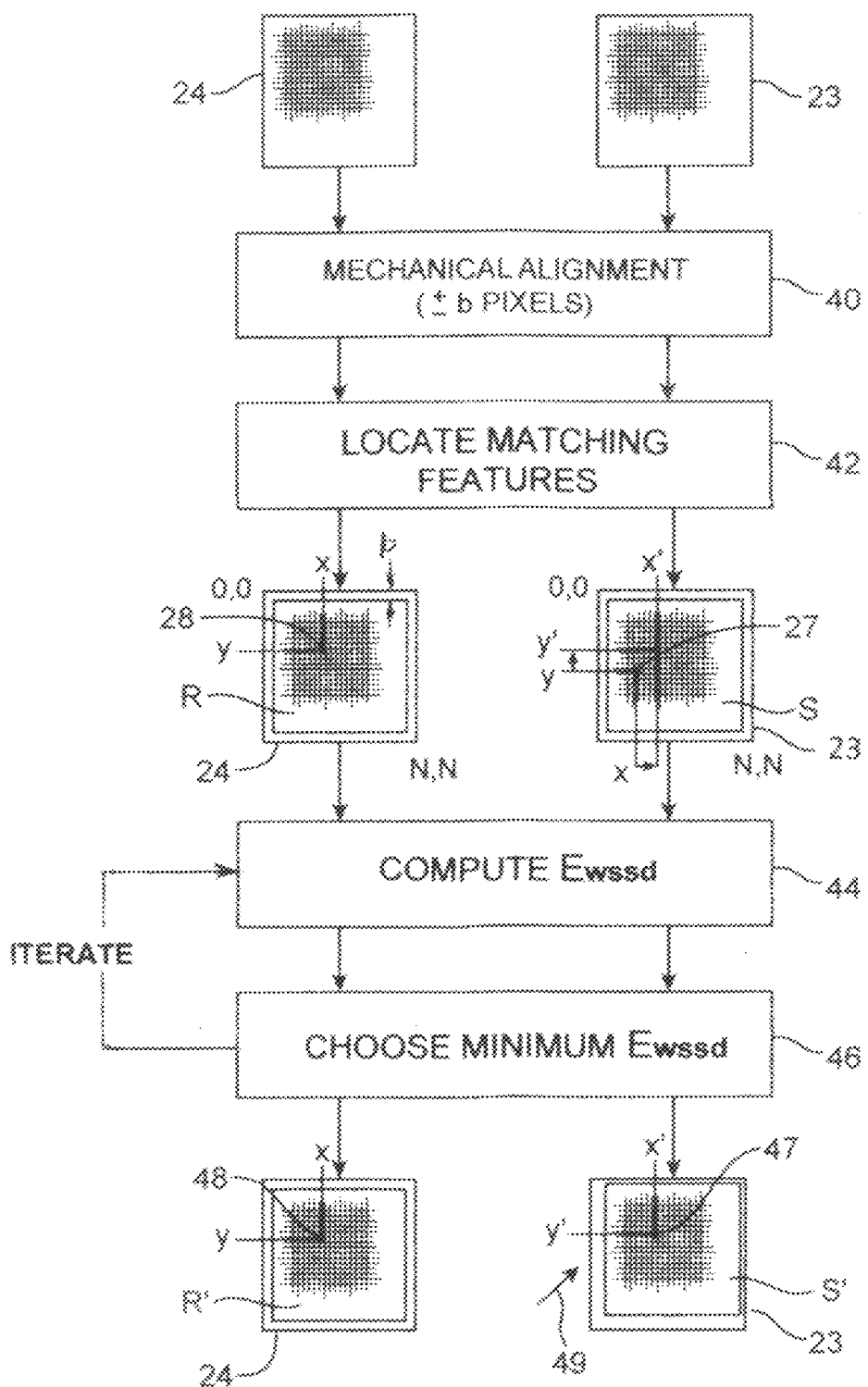
FIG. 10 is an algorithm for conjugating the foveal images on the two detectors.

FIG. 10 (Referring back to FIG. 9) is a schematic of the software for conjugating the position and pixel density of the complementary foveae on the two detectors for coordinated focusing on different objects (such as components of the car shown).

Many correlation approaches may be employed, but the first step should be a "primary alignment". Mechanically (as necessary) the two detectors 24 and 23 should be made coplanar, rotated and translated to bring them into approximate alignment while viewing their output to a display with images side by side. A fixed background of cross-hairs will help align particular observed points. A small adjustment of focal length may be required depending on the median distance to the objects viewed.

We are assuming (for the moment) that the two detectors 24 and 23 can be brought into alignment by ±p pixels, where p is an arbitrary but small number (such as 5). In order to fit the stitched images onto the detectors, we need to allow a frame 5 pixels less than the size of the detectors, all round. These image frames will be designated R and S.

It is necessary now that pairs of features (for example eight to twelve—there could be more—spread out over the area of the two detectors) be chosen for reference. They will form the framework of their respective images. The features themselves will exist as a subset of pixels within their foveal areas. The paired units should be very similar and have the same arrangement and number of pixels in both detectors. For selection, one of a number of edge detection algorithms can be used, depending on the purpose (e.g. J. Canny, "A Computational Approach to Edge Detection," *IEEE Transactions on Pattern Analysis and Machine Intelligence*, Vol. PAMI-8, No. 6, 1986, pp. 679-698).

It is necessary to point out that in assigning foveal areas we mimic the action of the human eye. That is, we choose a particular feature on which to focus our attention, and we assign the full foveal power of the eye on that feature (in the case of humans for a very brief moment).

The assignment of foveae creates the advantages first, the ability to bring the full resolving power of a large block of contiguous pixels (say 10,000 to 25,000) to bear on an object and second, the efficiency of quickly stitching a limited number of foveae to achieve full resolution imaging without ghosts or artifacts.

Here, with an edge detector (or other means) we choose a number of features distributed over the object field and surround them with foveal blocks of pixels.

In FIG. 10, having chosen one feature, such as transitions between light and dark green at the tip of the leaf, it may be seen as an array of pixels defined as fovea 28 on detector 24 (reference frame R) and may be compared to a similar array of pixels defined as fovea 27 on detector 23 (sample frame S).

One may note that the transitions defining a feature may be in any one of the primary colours (RGB or CMYK) alone. In this case (because of chromatic aberration) the identifying features may be in slightly different places. This creates the opportunity for aligning all colours in their optimum locations (i.e. correcting chromatic aberration). Since the features, when recognized, will be similar, we can use the algorithm below for alignment between such features. (This offers the opportunity also of organizing the colour features independently).

We can establish a precise alignment between the foveae such as 28 on R and 27 and S by using a least-squares solution and by taking the minimum of the sum of squared differences in features within these foveae. When all eight to twelve (or more) chosen features are lined up (and averaged, in case of minor differences) we call these new aligned frames R' and S' (with one matching foveal pair henceforth being numbered 48 and 47).

Using a notation common to the video industry (See Richard Szeliski, December 2006), we consider the minimum of the sum of squares function $E_{SSD}(u)$ for alignment $$E_{SSD}(u) = \sum_i [I_1(x_i + u) - I_0(x_i)]^2 = \sum_i (e_i)^2$$

Where u=(u, v) is the displacement and $e_i = I_1(x_i + u) - I_0(x_i)$ is the displacement frame difference (or offset) to be minimized between the two detectors ($I_0$ being the reference image and $I_1$ the sample). We know that because we are looking at the object (the leaf) from different viewpoints the images will be sufficiently different that the value of $E_{SSD}(u)$ will only approach zero. Choosing the lowest value (using the second differential) we obtain the closest correlation of images at the contiguous pixels at point 48 of detector 24 and the contiguous pixels at point 47 of detector 23. We continue doing this for the eight to twelve (or more) features chosen for bringing the frames R' and S' into alignment.

We may note that these new frames should (but may not necessarily) coincide with the boundaries of the detectors. In this case we use a windowed function $$E_{WSSD}(u) = \sum_i w_0(x) w_1(x_i + u)(e_i)^2$$

where $w_0$ and $w_1$ are zero outside the valid ranges.

Out of a quasi-circular foveal array of 10,000 to 25,000 pixels at points 48 and 47, we have already noted that a much smaller number, say 1,540 pixels in a fortuitous shape, (such as the tip of a leaf), may be enough to define our chosen light to dark transition, therefore sufficiently defining the positions of the surrounding foveal arrays 48 and 47. (The smaller the number of pixels, the faster and more efficient are the calculations.) The number 1,540 happens to coincide with the 35×44 pixel array of FIG. 18, which is enough to create significant information. A reference pixel array could be any shape (see FIG. 17) and as small as 10×10, such as an outlying (and not even necessarily contiguous) group of pixels 19 in FIG. 6. Process efficiency can also be increased by allowing larger beginning initial intervals for the displacement u=(u, v), say 5 pixels (increasing computation speed by the square), then reducing it towards 1 pixel as $E_{SSD}(u)$ approaches zero. In general, the displacement u can be fractional, but this increases process time. (For general viewing of video we have found that the eye can compensate for images in R' and S' displaced by several pixels). We can choose identifying transitions by shadow, colour, shape or other criteria, but we must be consistent to our purpose for each type of image.

The next procedure is to stitch the foveae efficiently. The process (not necessarily the results) will be identical over the frames R' and S'. (Because some cross-correlation (in real-time) is necessary between R' and S' this should be accomplished in parallel by a single computer). As with the human eye where the intensity and color (but not the resolution) of cones is distributed evenly over the retina, so the foveal signals described in this invention are evenly distributed over the area (but not necessarily in full resolution). To obtain equal resolution everywhere either we must populate the detectors fully with foveae or—making do with fewer foveae—we must (as in the human eye) settle for equal luminance and make a few outlying pixels do the work of many more.

The following method is one choice for feathering (i.e. filling) missing pixels. Once again using the notation common to the video industry (see Richard Szeliski, December 2006) we use a grassfire transform $$w_k(x) = \|\arg\min_y \{\|y\| \| \tilde{I}_k(x+y) \text{ is invalid}\}\|$$

where each valid (signal) pixel is tagged with its Euclidean distance to the nearest invalid (missing) pixel. The Euclidean distance map can be efficiently computed using a two-pass raster algorithm as suggested by Borgefors (1986). For reasons of efficiency the transform is used only in areas of the detectors most deficient in pixels. Otherwise, for smaller numbers of missing pixels an average value is take for small surrounding areas only:

$$C(x) = \Sigma_k w_k(x) \tilde{I}_k(x) / \Sigma_k w_k(x)$$

Where $\tilde{I}_k(x)$ are the warped (re-sampled) pixels in that area and $w_k(x)$ is 1 at valid pixels and 0 elsewhere.

Figure 11:
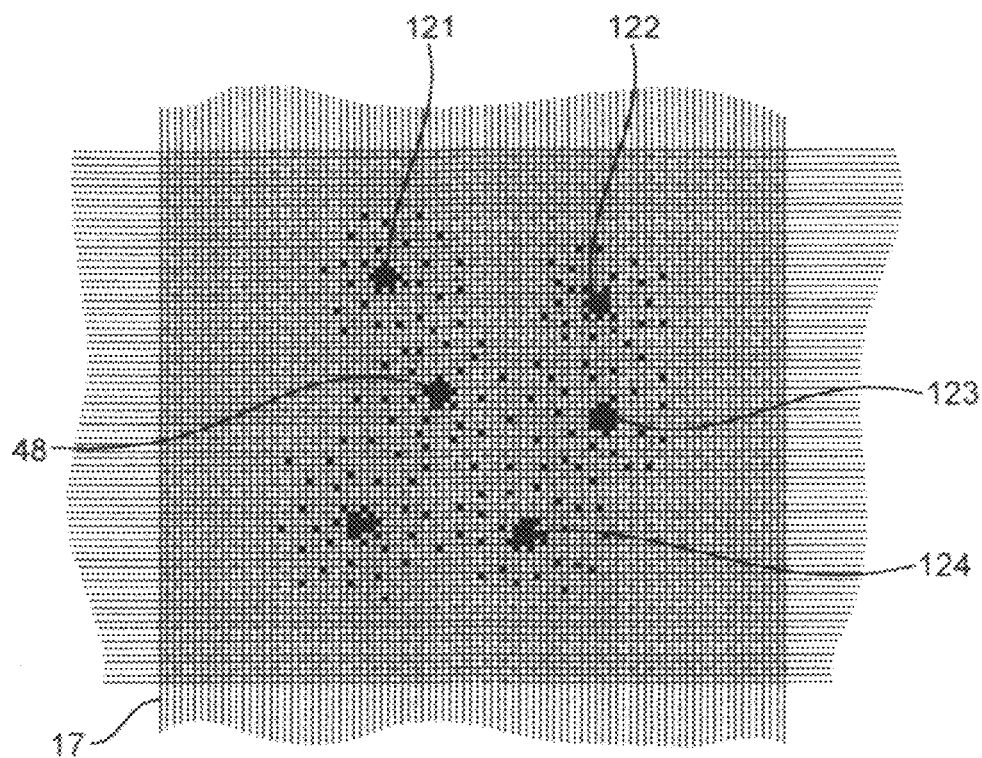
FIG. 11 shows a quasi-random scattering of foveal centers on a detector.

One result of this kind of transform and feathering is that within the computer the image fields around the conjugate foveae (based on the characteristics of the outlying pixel groups shown in FIG. 11) will be filled with graded pixels of the right characteristics such as colour, hue and intensity.

It may be noted that because the missing pixels have been adapted, the overall effect and luminance of the image will appear normal to the eye, except that the resolution around the foveal concentrations will be better. (This is very much how humans see the world.)

FIG. 11 maps this as a scattering of foveae on a small section 17 of a detector. The signal pixels are highly concentrated in the foveal areas but scattered in the intermediate areas.

In FIG. 11 the section 17 of the detector 23 shows foveae 48 surrounded by several others 121, 122, 123 and 124 in a (roughly) random group. Surrounding each fovea is a quasi-Gaussian grouping 11 of signal pixels.

Figure 12:
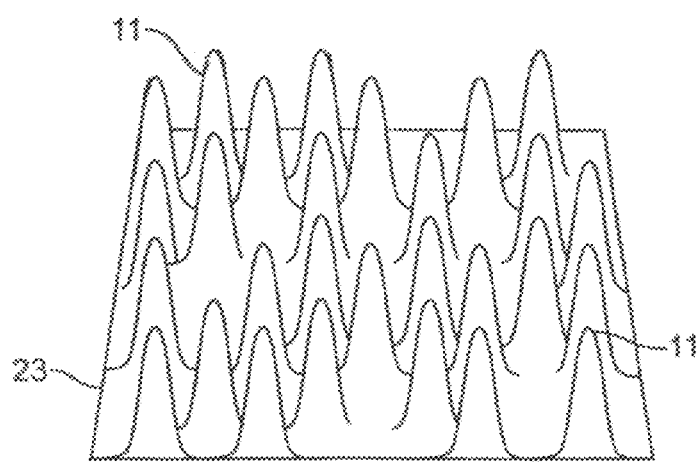
FIG. 12 shows a quasi-random population of foveae on a detector, in perspective

FIG. 12 shows a perspective view of detector 23 with the grouping 11 of pixels (in a much larger population).

Several advantages obtain with these outlying pixels 19. One is that they facilitate corrections in magnification and zoom. To magnify (or zoom in) one can move the foveae further apart and add intermediate pixels of the right graded characteristics, as above. To reduce (or zoom out) one can (similarly) remove some of the graded pixels. Since the foveae themselves are not altered this is efficient. So long as done as a small percentage there is no significant image degradation. This can be important in the (continual) cross-correlation and adjustment of the two detectors.

And, if ever the camera is dropped (or warped by heat) the mechanism noted earlier in FIG. 10 can be automatically invoked through software to reconjugate the foveae.

The mechanism of realignment and reconjugation is important in the case of mechanical zoom (that is, changing the focal length of the lenses), since the foveae will no longer be in matched positions and it is likely that the two magnifications will not be precisely equal. Here an algorithm for rapid realignment is essential. (See FIG. 10 and the discussion above.)

Going (just a little) into the mechanics of tracking, we make the assertion that one or more foveae (as in FIG. 11) can detach from their neighbors on the detectors and move across the field of view to track objects of interest. We may notice that features determining this group of foveae have moved by comparing successive frames (as above), applying a threshold value vis-à-vis other features, and computing a motion vector by determining the displacement as a function of time. (See, for example (i) Xu Han, Ying Sun, University of Rhode Island, 2002; or (ii) D. Chetverikov and J. Verestóy, "Motion Tracking of Dense Feature Point Sets" in *Proc. Workshop of the Austrian Pattern Recognition Group*, pages 233-242. Oldenbourg Verlag, 1997)

Tracking may be done for a number of features, or sets of features and associated foveae, moving independently. Sampling rates may be increased for these features (say from 60 frames a second to 120 or more) depending on their motion vectors, in order to smooth their motions and improve prediction. The prediction can be used to track (in general) just one group of foveae in order to activate the optics to follow.

Figure 13:
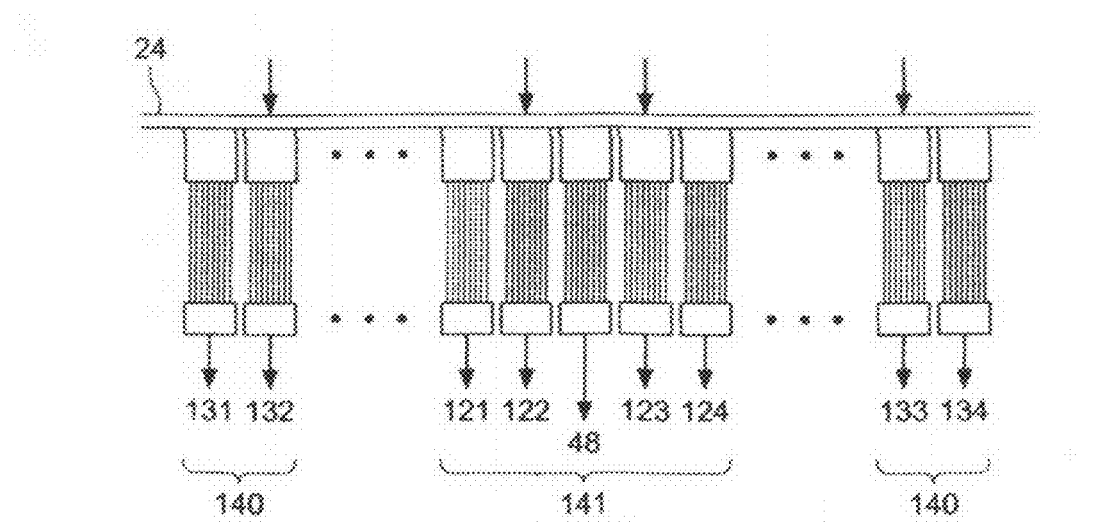
FIG. 13 shows independent data streams from those foveae, in parallel

FIG. 13 shows such a group of foveae 141, which (as an example) has been identified as capturing an object in motion against a relatively fixed background 140. Since only a relatively small number of pixels (i.e. features within the foveae) need to be followed, we may increase the sampling rate for these pixels significantly to smooth the observed motion of the whole group. The foveae 141 together can be treated as a moving video object. The background foveae 140 together will remain the video plane.

Figure 17:
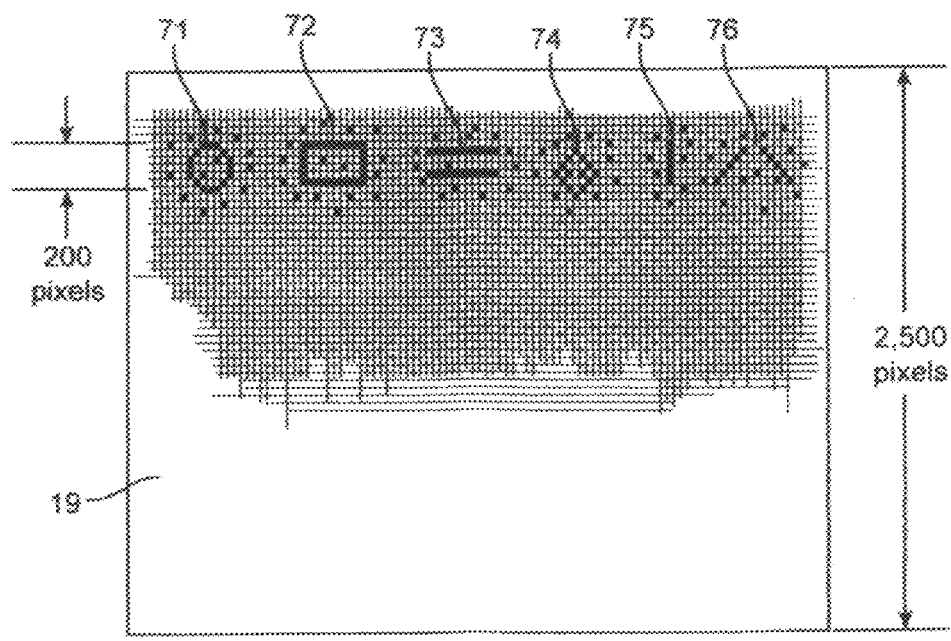
FIG. 17 shows some of the different foveal shapes and sizes possible, depending on requirements, such as tracking.

Although just a few features are being followed, we note that because they define the many associated foveal pixels (each having acquisition rates exceeding 40 Kbps), there will be no diminution of the quality of the moving image providing its frame rate is fast enough Referring to FIG. 17 we can imagine a detector with a single fovea with outlying pixels, like the human eye. A moving object with a bright surface could trigger a response in one or several of these outlying pixels. Depending on the objective (such as tracking) the fovea could quickly transform its shape into box 71 or parallel lines 74 for tracking the object across the field of view of the detector. (Other possible shapes include 73 for limits, 74 (as in frogs' retinas) for capturing horizontal motion, 75 and 76 as stops). The attributes of foveal mutation and assembly are important when dealing with imaged "video objects" moving across imaged "video planes".

Figure 14:
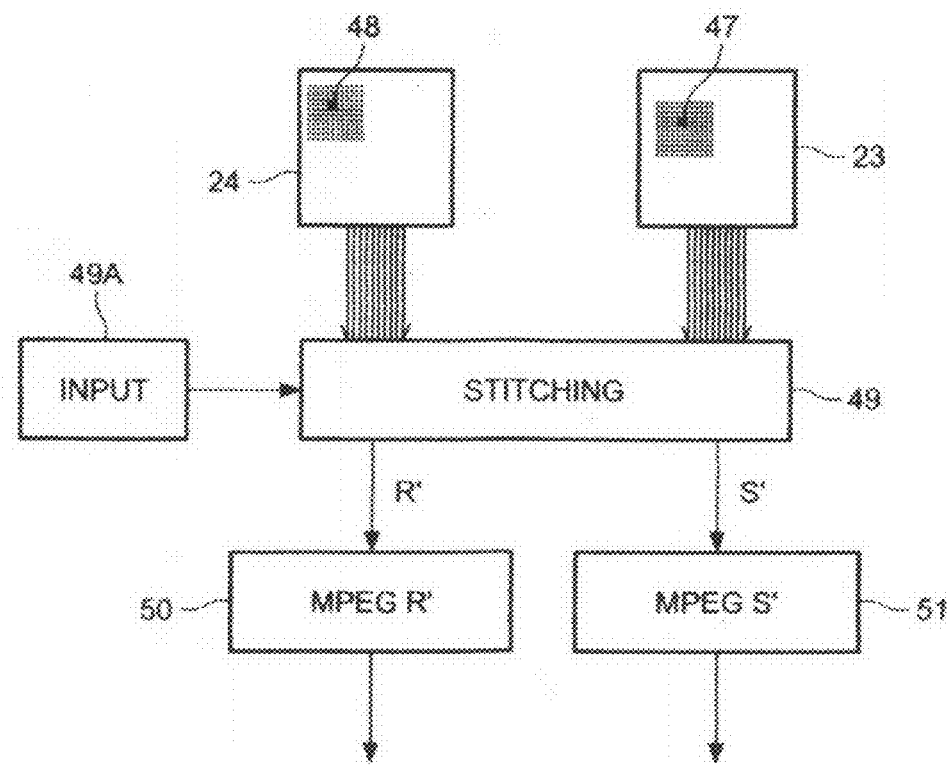
FIG. 14 is an algorithm for stitching the foveae and cross-correlating between the two detectors

FIG. 14 shows the outputs from detectors 24 and 23 entering the computer 49 as independent data streams (121 . . . , 131 . . . ) for processing. The block 49 is modifiable by input 49A. The outputs are fed into the left and right MPEG-4 blocks 50 and 51.

The inverse of observing a few conjoined features moving across a stable background, is to observe our eight to twelve framework features shifting simultaneously. It could be caused by simple camera movement. It could also be caused by a sudden jolt or vibration of the observing platform. Tracking these few framework features alone, and analyzing excursion patterns for displacement and frequency, we can use least variance and optimal prediction to enable efficient image correction and stabilization of the entire frames R' and S'. (See Y. Tian, Z. Ma, A. Liu, X. Zhang, Automation Research Center, Dalian Maritime University, May 2009)

Similarly, if all framework features on just one of the detectors are observed to shift, then it is likely to be platform vibration and can be corrected as above.

Figure 15:
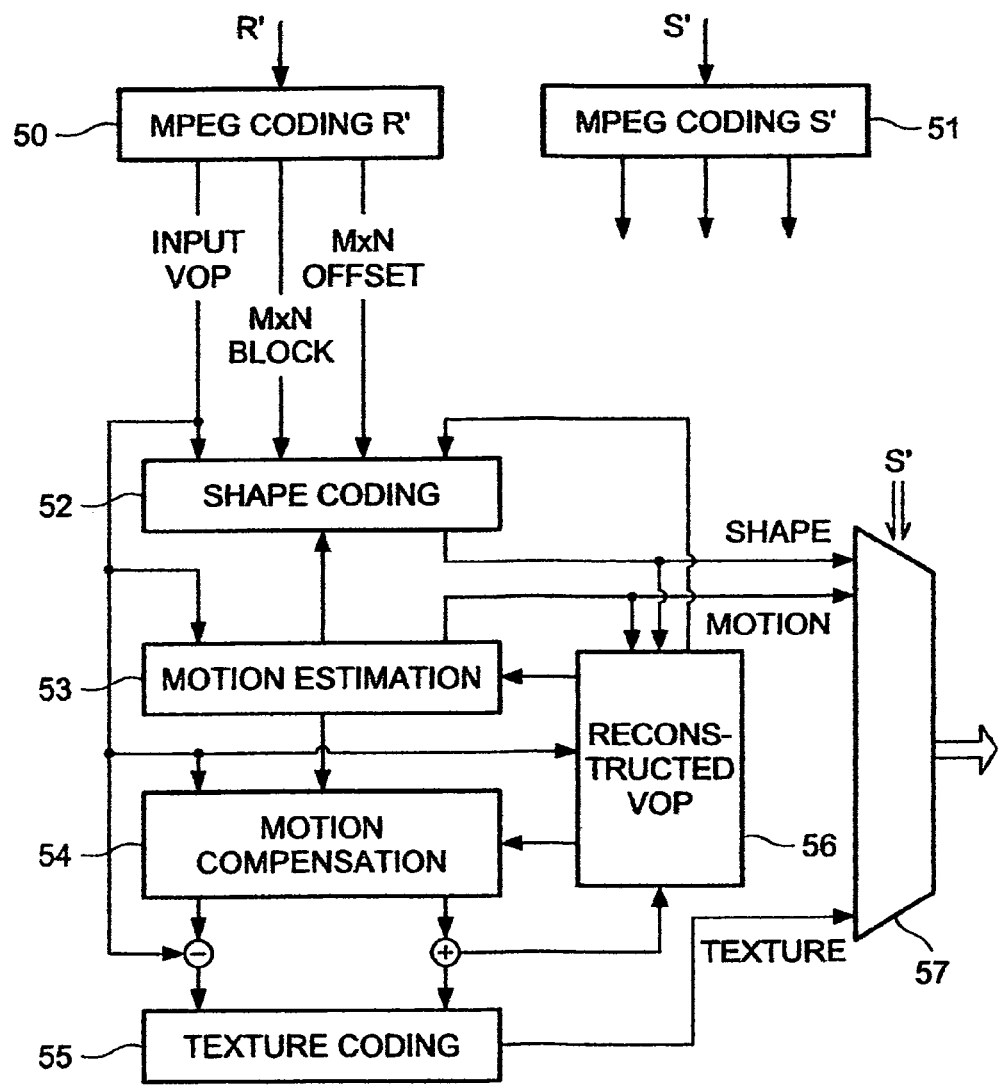
FIG. 15 is a compression algorithm for synchronously coding parallel data steams

FIG. 15 is an algorithm for image management after capture. (More precisely it will conform to H.264/MPEG-4 AVC, depending on the type and quality of transmission required). Parallel MPEG-4 coder blocks 50 and 51 synchronously compress the instantaneous output of the reference and sample data streams from detectors 24 and 23. These frames represent the left and right video object planes for 3D. These data streams are further processed for shape coding 52, motion estimation 53, motion compensation 54, and texture coding 55, for reconstruction 56 into single or parallel data streams for transmission 57 to display or storage in MPEG-4 format.

(Note: We are following MPEG-4, which is a collection of methods defining compression of audio and visual (AV) digital data introduced in late 1998. It was designated a standard for a group of audio and video coding formats and related technology agreed upon by the ISO/WC Moving Picture Experts Group (MPEG) under the formal standard ISO/IEC 14496. Uses of MPEG-4 include compression of AV data for web (streaming media) and CD distribution voice (telephone, videophone) and broadcast television applications).

Figure 16:
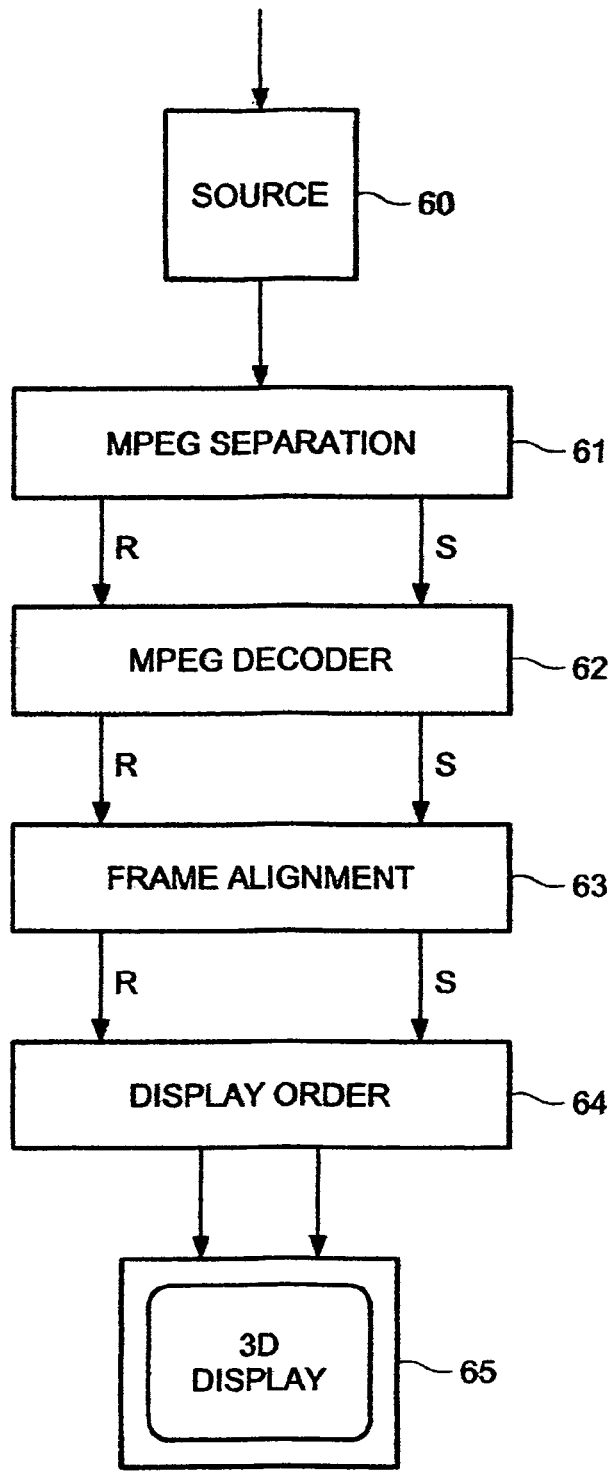
FIG. 16 is a display driver with two data streams for 3D.

FIG. 16 shows the final output to the display. This can be live (in virtually real time) or from storage 60. The first block 61 represents the separation of data streams into left and right, if previously combined. The second block 62 is the MPEG-4 decoder, which decompresses the left and right frames for display. The third block 63 is for the accurate alignment of the left and right frames for producing (good) 3D on the particular type of display. (This may have to be adjusted for individual displays). 64 is the driver for the display 65 itself. In the case of TVs many, if not all, of these blocks are provided by the display manufacturer.

Figure 18:
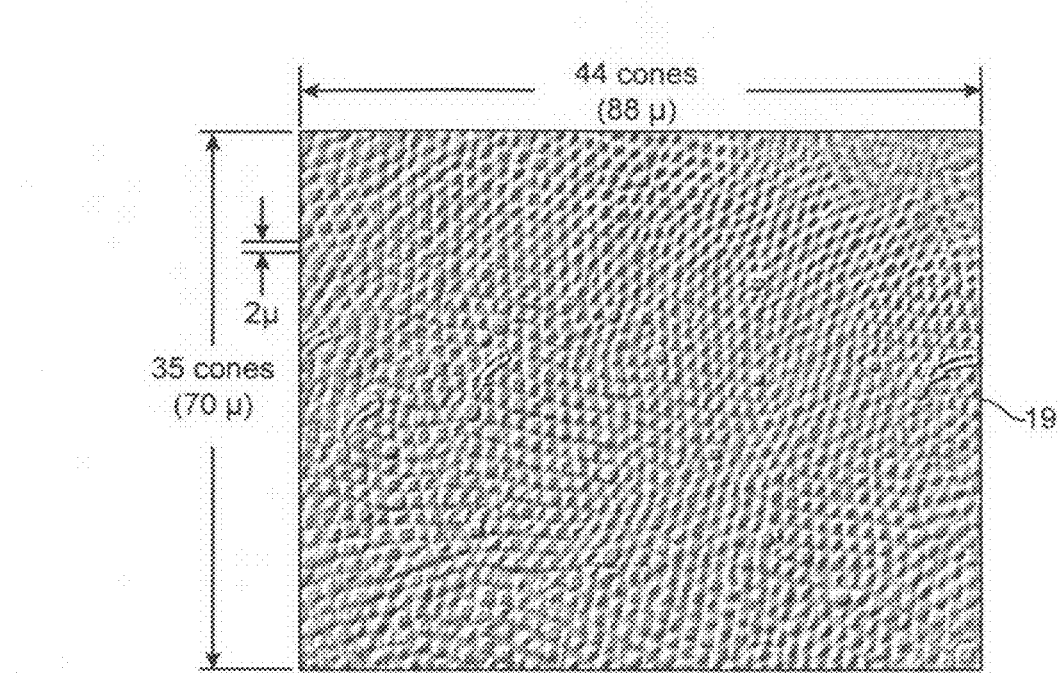
FIG. 18 is a photograph of part of an actual human foveola for reference. (At 70µ×90µ this area is tiny but contains massive processing power).

FIG. 18 is a photograph (for reference) of a section 19 of a human fovea, 44 cones (88μ) wide by 35 cones (70μ) high, containing 1,540 cones. (This tiny area already contains very significant data acquisition power).

Figure 19:
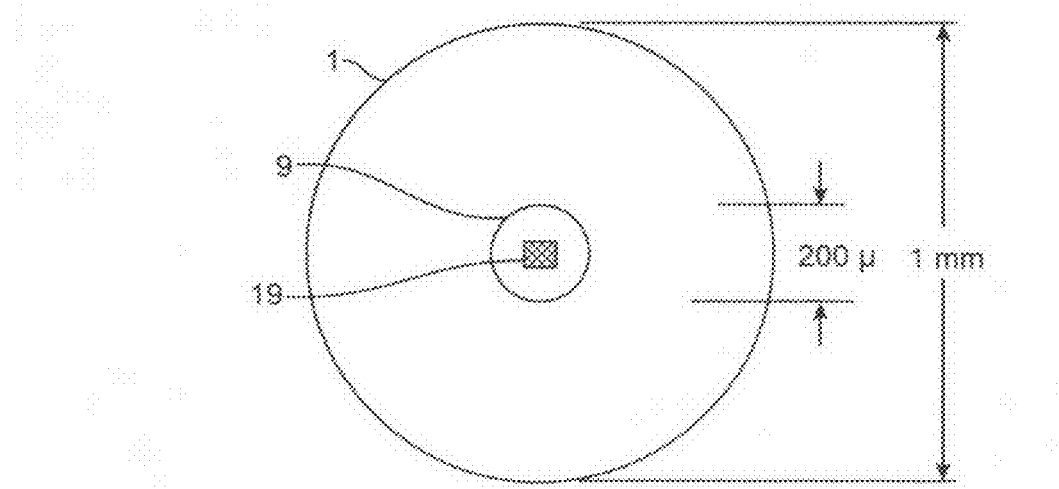
FIG. 19 shows the scale of the foveola within the fovea, for reference.

FIG. 19 shows relative scale. Section 19 (from FIG. 18) sits inside the foveola 9, which is 200μ in diameter. This sits in turn inside the fovea 1, which is 1 min in diameter. This represents only 0.1% of the entire retinal area (diameter 42 mm) but contains more than 50% of its imaging capacity. (We here confirm the calculation that the foveola contains 10,000 and the fovea 50,000 cones).

Figure 20:
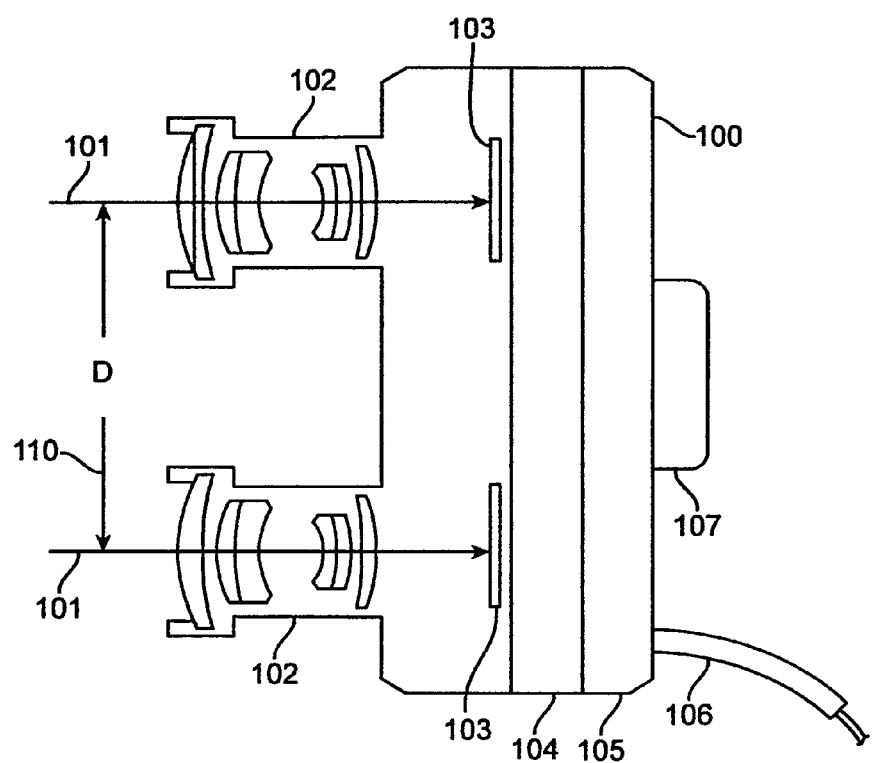
FIG. 20 is a schematic of the kind of apparatus actually used in making these observations, a dual lens camera for three dimensional video recordings.

FIG. 20 is an embodiment of the apparatus used in this application. Two matched lenses 102 focus the incoming rays 101 from small features in the field of view onto complementary foveae such as 27 and 28 (see FIG. 9) of coplanar matched detectors 103. Information is controlled and processed through the electronics 104 which contains chips for implementing a number of algorithms for assembling whole ghost-free 3D images. (These algorithms include those in FIG. 10, FIG. 14, FIG. 15 and FIG. 16.) 105 contains a large memory (in this instance 96 GB; it could be much larger). 106 is a (detachable) cable to a display or remote storage. 107 is a rechargeable lithium-ion battery. The distance 110 between the lenses is not critical (at this level) but happens to be 65 mm, similar to that of a pair of human eyes.

While the invention has been described and illustrated as one in which the foveae and pixels have certain numbers and dimensions, and which is applicable in the visible spectrum, in fact to those skilled in the art the techniques of the invention can be used as tools for perfecting three-dimensional images throughout the electro-magnetic spectrum. It may be understood that although specific terms are employed, they are used in a generic and descriptive sense and not for the purpose of limitation, the scope of the invention being set forth in the appended claims.

In one example of the invention, a field of view is formed with an imaging device containing two (or more) sets of imaging optics and detectors in the following manner:

the imaging optics and detectors are brought into close initial alignment by means of their outputs to a visual display or by other means;

identifying objects ("features") are identified within said field of view sufficiently distributed and in a sufficient number to define that field within said imaging optics and detectors;

a group of detecting elements around each said feature are designated as a "fovea" (or in the case of multiple fovea, "foveae"), which said group is sufficiently small for imaging said objects narrowly, but sufficiently large for the time-efficient stitching of full-field images;

correlating the foveae pair by pair (or set by set) on two (or more) detecting areas (said foveae thereby becoming "conjugated" or "complementary");

and combining a number of said foveae by means of stitching algorithms in each detecting area to form full-field images. The foveae can contain any convenient number and configuration of detecting elements.

In another example of the invention, an imaging device for three dimensional recording in the visible spectrum has:

a set of imaging optics and detectors capable of recording visible images;

a process of imaging narrowly and reconstructing to create full-field images with enhanced quality (for example free of artifacts or ghosts);

electronics and algorithms capable of processing such image data;

and a means for delivering such images to a display or to memory.

In another example of the invention, the detecting elements are pixels. In another example of the invention, the pixel sizes of the order of 2μ, and the detector pixel sizes may be the same as the cone sizes in the foveae of human or specie eyes. In another example of the invention, the detectors are (for example) five or ten Megapixel CMOS or CCD chips. In another example of the invention, imaging narrowly ("focusing") is achieved by limiting the recording pixels to multiples of 10,000 to 25,000, representing small areas ("foveae") of large detectors. In another example of the invention, the concentration of the recording pixels over each fovea and periphery ("limbs") is quasi-Gaussian.

In another example of the invention, a stereoscopic recording system has two (or more) complementary detectors which may have any of the following functions or structures:

be brought into initial fine alignment;

be re-aligned automatically in the event of the optics being dropped or warped;

has movable components which are not absolutely necessary for functioning;

has foveae which can be immediately made to lock onto and follow an area of motion;

has multiple foveae which can be made to independently follow multiple objects;

has foveae which can be an annuli or other shapes so that they can contain or follow the objects being tracked, or act as "stops" to cause the entire optics to swivel to track certain objects;

has a "containment" algorithm which maintains the foveated annuli (or other shapes) around moving objects as they are being tracked;

the precise locations of objects being tracked may be quickly reported, for example to allow the camera itself, like a head, to swivel;

by increasing sampling rate, the motion of objects can be smoothed for display and tracking.

In another example of the invention, virtually real-time video can be created using any of the following methods:

handling pixels in blocks ("foveae", such as 10,000 to 25,000 pixels) instead of singly;

stitching foveal images together with a small number of outlying pixel blocks (such as 10×10 pixels);

using simple algorithms (such as light and dark recognition) within small (for example, 10×10 pixel) feature blocks to locate foveae;

using high-speed compact electronics;

using processors or computers in close proximity to the detectors;

In another example of the invention, a stereoscopic recording system has:

pixel sizes which can be from $0.1\mu$ to $10\mu$, or any convenient dimension;

detectors which can be other than CMOS or CCD chips, for example X-ray, infra-red, radio wave or microwave detectors;

a lens system which can be refractive or reflective depending on the application and wavelength of interest.

In another example of the invention, a stereoscopic recording system has:

color pixels (RGB or CMYK) which can be brought into alignment independently and then stitched, eliminating chromatic aberration;

different color pixels which can be organized in any arrays or shapes independently of each other (for example, for special effects).

In another example of the invention, the stereoscopic recording system has pixel groups which may be organized in such shape and size as to recognize attributes of objects such as light and dark, edges, shapes, color, discontinuities, shininess, and motion.

In another example of the invention, a stereoscopic recording system has:

detectors which may each contain one or multiple complementary foveae;

foveae which can assume any shape, size or profile, or be discontinuous;

the shape, size, profile and number of complementary foveae can be changed dynamically;

the shape, size, profile and number of foveae can be statically or dynamically or mismatched between the detectors, for example for purposes of display;

the sampling rate may be highest in the foveae and much less in the limbs;

the foveae can scan the field of view quasi-randomly;

the foveae may be programmed to recognize and respond to shapes and contours for the enhancement of some pixels and the suppression of others.

In another example of the invention, a stereoscopic recording system has:

detectors with lenses of other focal lengths which may be used for far- or near-field objects;

images from multiple sets of detectors which can be combined to increase field depth;

images from multiple sets of detectors which can be combined for special effects.

The invention claimed is:

1. A method of forming three-dimensional images from a plurality of optical detectors, each said optical detector coupled to associated optics and having an associated optical path and associated field of view, the method operative on a controller and comprising the steps of:

acquiring images from each said detector and identifying coarse features in said acquired images;

aligning said imaging optics and detectors by comparing said coarse features found in said acquired images;

for an acquired image from each detector, identifying features within each associated said field of view and identifying a fovea region surrounding said features within said field of view, said fovea region sufficiently large for stitching images from said fovea region into a full-field image spanning said field of view;

aligning said fovea region of each said detector by correlating said features from each said detector to maintain the spatial relationship between each said fovea region;

forming said three-dimensional images by stitching said fovea regions from each said detector.

2. The method of claim 1 where said detector is formed of pixels, and said fovea region of each said detector has non-uniform detector pixel density.

3. A stereoscopic recording and viewing system comprising:

a plurality of imaging optics and associated image detectors capable of recording images, each said image detector thereby generating an image output;

an image processor coupled to each said image output;

for each said image output, said image processor using image features as criteria for selection and identifying regions of interest containing prospective fovea, said image processor thereafter selecting fovea from said prospective fovea, said fovea corresponding to a region surrounding selected image features in each said image output;

said processor generating a continuous stream of image data for output to two display systems for viewing as image pairs for three-dimensional viewing.

4. The stereoscopic recording system of claim 3 where said each said detector is formed with pixels having a size on the order of $2\mu$.

5. The stereoscopic recording system of claim 3 where said plurality is two, and the associated images of two complementary detectors are brought into initial alignment and subsequently brought into finer alignment than said initial alignment when loss of alignment is detected.

6. The imaging device of claim 3 where said image detector provides higher resolution in said selected fovea than in other regions.

7. The stereoscopic recording system of claim 3 where said associated optics for a detector follows a selected object to maintain said selected fovea near a central region of said detector.

8. The stereoscopic recording system of claim 3 where said fovea comprises a detector region of 10 pixels by 10 pixels or less.

9. The stereoscopic recording system of claim 3 where the detector is comprised of pixels, each said pixel in the size range from $0.1\mu$ to $10\mu$.

10. The stereoscopic recording system of claim 3 where said imaging optics have refractive or reflective elements.

11. The stereoscopic recording system of claim 3 where said prospective fovea are selected on the basis of at least one of the image characteristics: feature lightness or and darkness, feature edges, feature shape, feature color, feature discontinuities, feature shininess, or feature motion.

12. The stereoscopic recording system of claim 3 where said detector includes a region with increased pixel density in a region where said image features of said fovea are more likely to be detected.

13. The stereoscopic recording system of claim 3 where:
images from multiple sets of detectors operative for different focal depths are combined to increase field depth.

14. The stereoscopic recording system of claim 3 where said detectors are five to ten Megapixel CMOS or CCD chips.

15. The stereoscopic recording system of claim 3 where said fovea is 10,000 to 20,000 pixels of said detector.

16. The stereoscopic recording system of claim 3 where said display system output is in the range of 10,000 to 25,000 pixels.

17. The stereoscopic recording system of claim 3 where the density of pixels in the detector in regions of prospective is quasi-Gaussian.

18. The stereoscopic recording system of claim 3 where said detector has a sampling rate which is increased when image features of prospective fovea are moving at high rates.

19. The stereoscopic recording system of claim 3 where said detectors are responsive to at least one of X-ray, infrared, radio, or microwave radiation.

20. The stereoscopic recording system of claim 3 where said region of interest containing prospective fovea is dynamically determined.

21. The stereoscopic recording system of claim 3 where said region of interest containing prospective fovea is statically determined.

22. The stereoscopic recording system of claim 3 where the image sample rate in a region of said fovea is greater than the image sample rate in surrounding regions.

23. The stereoscopic recording system of claim 3 where said identifying regions of interest containing prospective fovea uses comparison of said image to a specific set of shapes and characteristics.

* * * * *